3,455,711
PAPER-BASED MOLDING MATERIAL
Wanda C. Cooper, 2315 San Felipe, and Gerald M. Cooper, 2308 Indiana, both of Houston, Tex. 77019
No Drawing. Filed Apr. 14, 1966, Ser. No. 542,472
Int. Cl. C04b 11/08
U.S. Cl. 106—115          3 Claims

ABSTRACT OF THE DISCLOSURE

A molding material offering convenient mixing with water in preparation for use, ready molding, smooth surface texture and adequate strength and durability for most purposes is achieved by the combination of about one unit weight of starch, one to two unit weights of paper fibers and ten to twenty-five unit weights of plaster. Immediately prior to use, the addition of about one unit weight of water for each unit weight of dry ingredients produces a material having a consistency suitable for hand or trowel shaping and finishing which will set in approximately one-half hour without troublesome shrinking or warping.

---

Our invention relates to a paper-based molding material suitable for marketing in dry form which, upon the addition of water in the proper amount, may be used in the construction industry, in the arts and crafts and in related applications. Specifically, it is contemplated that such material will find primary utility as a wall surfacing or other interior finish for building construction, and for molding various objects both useful and ornamental.

Materials which are plastic when wet and set to a relatively smooth and durable finish find wide application in building construction, primarily of the residential type, and such materials also are used for molding various items, particularly including stage sets. They owe their utility to their economy and relative ease of fabrication, and any application which requires an attractive surface at minimum cost may employ a material of this type. Among the materials presently available in this category are various types of plaster, some of which are broadly identified as plaster of paris, special molding clays of several types and compositions, and more recently, certain synthetic resin-based materials. Our invention constitutes a material which is believed to be superior to anything presently available in its unique combination of desirable characteristics. It offers convenient mixing, ready molding into any desired shape to present a smooth surface, and it possesses adequate strength and durability in addition to its low cost. There also are certain additional advantages as will be described.

Our material is composed of paper fibers, a starch binder and molding plaster. We have found that by reducing scrap paper to fibers of relatively small size, and mixing such fibers with a precooked starch and a substantial amount of commercially available plaster, we can produce a dry material which is quite stable and easy to handle, and which can be stored for long periods of time with only normal moisture protection. The addition of a measured amount of water and a relatively brief and simple mixing operation produce an unusually high grade of molding material which bonds to almost all surfaces and sets rapidly.

In accordance with the foregoing, it is the principal object of our invention to provide a paper-based molding material which can be packaged, shipped and stored in dry form and made ready for use by the addition of water in an appropriate amount.

It is a further object of our invention to provide a dry paper-based molding material of unusually high quality in relation to its cost which can be conveniently packaged and transported, in relatively small amounts or in bulk and which will retain its useful properties despite long periods of storage.

It is a further object of our invention to provide an economical molding material having sufficient strength and durability for a wide range of applications, and the ability to bond to almost any surface, including wood, metal, glass, wire, and metal lath.

It also is an object of our invention to provide a dry paper-based molding material which can be brought to any desired degree of plasticity through the addition of water, and quickly molded or finished by hand, or with hand tools, after which it will assume an initial set within a relatively brief period of time.

Our molding material in its primary form is composed of approximately one part starch, one and one-half parts paper fibers, and from ten to twenty-five parts dry molding plaster (hydrous calcium sulphate), by weight. These constituents, mixed to a condition of substantial homogeniety, show little tendency to separate despite prolonged periods of storage and despite rough handling during shipment and storage. Although the chemical reactions which result from the addition of water are only partially understood at this time, the properties of the resulting material are quite useful, in that it is both strong and durable, it will bond to most surfaces, it sets rapidly, usually within one-half hour, and it may be painted immediately after setting with any water-based paint. In addition, it yields readily to sanding for a smooth surface texture, or it may be trowel finished to any desired condition.

Paper fibers for the material may be produced by reducing bulk paper in an appropriate grinder or shredder. Economy suggests the use of scrap paper, and although any grade is suitable, it will be apparent that better grades of scrap paper, such as that used in slick paper magazines, will produce a product of higher quality.

The means for reducing the paper to a fibrous condition may be chosen from among several available items of equipment, but the result of the grinding or shredding operation preferably should range in size from a condition much like powder or dust up to approximately one-quarter inch maximum dimension. The distribution of particle sizes over this range is not critical.

Although particles which will pass through a one-quarter inch screen have proven to be particularly suitable for most applications of the material, it will be apparent that the use of smaller or more finely divided particles will produce material having a finer texture, whereas larger particles will produce a coarser texture. We have found that a conventional hammer mill is a particularly suitable device for reducing paper to the proper condition for use in our material. A mesh screen at the point of exit from the mill confines the material until the particles are of the desired size. Thus, for uses of the material in which the maximum particle size is not to exceed one-eighth inch or when the maximum size is extended to three-eighths inch, a simple change of the size of mesh at the exit from the hammer mill will accomplish the proper result.

It is believed that the starch provides the primary binding agent for the finished material. Although any vegetable starch will serve to some extent, we have found that corn starch, either yellow or white, is particularly suited to our purpose. Further, a relatively economical type of commercial available starch which is precooked and at least partially degelatinized serves to produce a molding material of exceptional quality, without impairing its economy. Such starch can be readily distributed through the paper fibers and molding plaster, and does not show an objectional tendency to ball up when water is added. Further, it has little tendency to separate out of the mixture in storage and handling.

A very high quality of molding material is produced when the three constituents are combined in a weight ratio of one part starch, one and one-half parts paper fibers, and sixteen parts plaster. The amount of plaster is less critical than the amount of starch, and to one part starch and one and one-half parts paper fibers, there may be added from ten to twenty-five parts plaster. There is some variation in strength and texture with the amount of plaster, and amounts over the prescribed range can be chosen in accordance with the proposed use of the material.

It is not advisable to reduce the amount of starch below one part to each two parts paper, and it is not necessary to increase such ratio beyond one part starch for one part paper. Consistently good results are obtained, and a product suitable for most commercial applications results when paper fibers are present in the range of one and one-quarter to one and three-quarters parts by weight for each unit weight of starch. In general, we have found that the better grades of paper should be used with the lesser amounts of starch.

It is essential that the paper fibers, starch and plaster be mixed to a condition of substantial homogeniety. A large blender in the form of an inverted cone in which the constituents are introduced and agitated by circulating air has proven to be particularly suitable. Introducing the material at the top of the unit and removing it at the bottom permits continuous mixing, and it is convenient to package the material immediately upon its emergence from the blender. This will prevent deterioration from exposure to atmospheric moisture.

The dry material may be sacked in conventional kraft paper bags or other convenient and economical containers. We have found that any of several impervious materials including heavy paper and plastics will provide a quite satisfactory barrier against moisture during normal storage conditions.

Our molding material will assume a consistency much like molding clay upon the addition of approximately one pound of water for each pound of material, dry weight. For some purposes, it frequently will be desirable to render the material more plastic, and the amount of water may be increased up to one and one-half pounds for each pound of material, dry weight, beyond which range it becomes too liquid for practical application.

When dry, the material becomes surprisingly hard and tough. It may be sanded to produce a smooth surface, and it may be painted. It has excellent shrinkage characteristics, and shows little tendency to crack even in thick applications. For most normal uses, shrinkage and cracking will pose no problems for the user.

A specific example of our molding material would involve a convenient amount, say fifteen pounds of scrap paper of magazine quality. After such paper is shredded in a hammer mill and removed through a one-quarter inch screen to insure that no particles are larger in maximum dimension, a dry, powdered, precooked and degelatinized corn starch is introduced. To fifteen pounds of paper fibers, ten pounds of corn starch would be sufficient.

As a result of the shredding of the paper, the fibers will be light and fluffy, and can be readily mixed with powdered corn starch. This may be accomplished immediately, or mixing can be deferred until hydrous calcium sulfate has been added. In the present example, 150 pounds of hydrous calcium sulfate is added.

To our molding material may be added various special agents to give it additional properties, or to adapt its existing properties to special circumstances. For example, fast drying additives, wetting agents, fireproofing agents and special aggregates may be introduced. It is necessary only that such additional materials be well mixed with the paper fibers and starch, and that they display no excessive affinity for moisture which would adversely affect the dry storage characteristics.

Various modifications of our material will occur to those skilled in the art. Thus, we wish to protect by letters patent all such changes and modifications which fall within the scope of the following claims:

We claim:

1. A dry paper-based molding material consisting essentially of a substantially homogeneous mixture of dry paper fibers of a size not exceeding one-quarter inch maximum dimension, dry powdered corn starch and molding plaster combined in a weight ratio of one part starch, one and one-half parts paper fibers, and sixteen parts plaster.

2. A dry paper-based molding material consisting essentially of a substantially homogeneous mixture of dry paper fibers ranging in size from powder to particles not exceeding three-eighths inch in maximum dimension, dry, powdered, degelatinized corn starch, and molding plaster, combined in a ratio by weight in a range between one and two parts paper fibers, and ten and twenty-five parts plaster for each part starch.

3. A dry paper-based molding material consisting essentially of a substantially homogeneous mixture of dry paper fibers ranging in size from powder to one-quarter inch maximum dimension, dry powdered corn starch and molding plaster combined in a weight ratio of from one and one-quarter to one and three-quarters parts paper fibers and ten to twenty-five parts molding plaster for each part starch.

References Cited

UNITED STATES PATENTS

| | | | |
|---|---|---|---|
| 1,256,621 | 2/1918 | Weissmann | 106—114 |
| 2,322,194 | 6/1943 | King | 106—115 |

JAMES E. POER, Primary Examiner

U.S. Cl. X.R.

106—315